United States Patent [19]

Janak et al.

[11] 4,366,512
[45] Dec. 28, 1982

[54] METHOD AND APPARATUS FOR DIVIDING A TRACK ON A MAGNETIZABLE INFORMATION STORAGE DISC INTO SECTORS

[75] Inventors: Miloslav Janak, Sunnyvale, Calif.; Helmut Schönwald, Niederschelderhütte, Fed. Rep. of Germany; Eduard Tercic, Siegen, Fed. Rep. of Germany; Martin Ginsberg, Daaden, Fed. Rep. of Germany

[73] Assignee: U.S. Philips Corporation, New York, N.Y.

[21] Appl. No.: 168,843

[22] Filed: Jul. 10, 1980

[30] Foreign Application Priority Data

Jun. 20, 1979 [DE] Fed. Rep. of Germany ....... 2924781

[51] Int. Cl.³ .............................................. G11B 5/09
[52] U.S. Cl. .................................. 360/48; 360/50
[58] Field of Search ................................. 360/50, 48

[56] References Cited

U.S. PATENT DOCUMENTS 3,711,844 1/1973 Irwin .................................. 360/4 F Primary Examiner—Vincent P. Canney
Attorney, Agent, or Firm—James J. Cannon, Jr.

[57] ABSTRACT

Method and apparatus for dividing a track on a magnetizable information storage disc into sectors by writing sector identification information into the track. In order to optimize the storage capacity of a track on a magnetizable information storage disc the track is first filled with information bytes in response to the occurrence of the leading edge of an index pulse (a) derived from the disc in such manner that a predetermined number of bytes fill a portion (ix) of the track, followed alternately by sector identification bytes and further bytes defining the data field of the relevant sector in portions SK and DT respectively until the final group of sector identification bytes has been written into portion SKn, followed by further bytes into portion z until the leading edge of the next index pulse occurs. The (positive or negative) difference between the total number of bytes in the portions z+ix and the number of bytes in each of the data field portions (DT) is then determined and the write operation is then repeated in the same track with the number of bytes written in the data field portions modified in accordance with the difference determined, so that the difference is distributed uniformly over the various data field portions. The write operations are controlled by apparatus comprising counters which address a read-only memory containing the information bytes, an arithmetic unit for determining the difference, and a store storing the modified number of bytes to be written to define each data field.

8 Claims, 3 Drawing Figures

METHOD AND APPARATUS FOR DIVIDING A TRACK ON A MAGNETIZABLE INFORMATION STORAGE DISC INTO SECTORS

BACKGROUND OF THE INVENTION

1. Field of the Invention

The invention relates to a method of dividing a track on a rotatable magnetizable information storage disc into m sectors by writing information bytes into said track until said track becomes full and in such manner that m groups of said bytes, each containing n bytes and comprising sector identification information, are written in succession with N further bytes written between each said group and the next to be written (if present). The invention also relates to apparatus for carrying out such a method.

2. Description of the Prior Art

It is necessary to subdivide the tracks on a storage disc into sectors, each provided with identification information, in order to facilitate the accessing of a particular set of data in a given track. Accurate subdivision of a track on a storage disc into sectors is limited only by the properties of the disc drive and the read-write channel which accesses the track. Various standard formats have become available, especially for "flexible discs", and the commonest of these in use is written in standard "ECMA-54". When this format is used the part of a sector other than the sector identification information consists of the nominal data field plus a preceding and a succeeding portion which are effectively gaps in the useful information. These gaps are desirable because, when a new set of data is to be written into the data field of a given sector, first of all the times of sector identification information are read from the relevant track until the desired sector number is found. The accessing system is then switched over to the write mode. This switching can only take place a finite time after the end of the relevant sector identification information has been accessed if the latter is not to be destroyed by the newly switched-on erase current. After the new set of data has been written, the erase current has to be switched off, and this must be done in such manner the erase current is present while the whole of the portion of the track in which the new data set is written in accessed, but is absent when the immediately following sector identification information is accessed. Allowance must also be made for the fact that the rotational speed of the storage disc may deviate from the nominal value, and there are other mechanical and electrical tolerances to be taken into account, so that the gaps take up a significant area of the storage disc. The lengths of the individual portions of the track, i.e. the portions containing the sector identification information and the portions corresponding to the data fields and the gaps are in each case defined by initially filling the track by a given series of bytes, the data content of which bytes is of a predetermined kind where the relevant track portions are to contain, for example, sector identification information or other information of a useful nature, but elsewhere arbitrary. This series is written into each track of the disc by means of an automatic machine specially constructed for this purpose. Between the gap following the data field of the last sector and the sector identification information of the first sector there is a larger gap which also contains a predetermined number of bytes and, in order to achieve this, such automatic machines contain expensive drive mechanisms capable of a very precisely controlled speed. This gap (in the useful information) between the last and the first sectors is chosen to be of such a size that, if the sector subdivision information is subsequently rewritten using a normal commercial drive mechanism, even at the fastest rate of rotation of the disc possible within the tolerance imposed thereon, the end of the last sector will not extend into the beginning of the first sector.

During their useful life, however, such storage discs are only in fact likely to be provided with the sector subdivision information once, i.e. by the manufacturer, the user hardly ever requiring to change it subsequently. Because of this, the gap between the last and the first sectors, which gap is not used for useful storage purposes, is normally superfluous. In other words, this gap (and also the other gaps) are provided to allow for a large number of individual tolerances, whose occurrence is improbable and in practice hardly ever occur at the same time.

SUMMARY OF THE INVENTION

It is an object of the present invention to enable as much use as possible to be made of the available storage area on a storage disc without requiring the provision of highly accurately controlled drive mechanisms.

The invention provides the number r of bytes present in the track between the last said group and the first said group when the track has become full is determined and the track is then refilled with information bytes in such manner that m groups of said bytes, each containing n bytes and comprising sector identification information, are written in succession with $N+K$ further bytes written between each of these groups and the next to be written (if present), where K is equal to $(r-N-j)/m$ if $(r-N-j)/m$ is a whole number, and K is equal to the next whole number below $(r-N-j)/m$ if $(r-N-j)/m$ is not a whole number, j being a positive number or zero.

The invention also provides apparatus for carrying out such a method comprising a byte clock signal generator, a number store, a first counter constructed to generate, when activated, a signal at an output thereof when m pulses have been applied to a clock input thereof, a second cyclic counter arrangement to a clock input to which the output of said generator is coupled, to a data input of which the output of said number store is coupled, and to a count-inhibit input to which the output of the first counter is coupled, which arrangement is constructed, when activated to perform a complete cycle each time $n+x$ clock pulses are applied thereto, where x is the content of said number store, and to generate during each cycle a signal at an output thereof when n clock pulses have been applied to its clock input, a coupling from said output of said arrangement to the clock signal input of the first counter, a third counter to a clock input to which the output of said generator is coupled and to a count-enable input to which the output of the first counter is coupled, an arithmetic unit to inputs to which the output of said number store and a count signal output of said third counter respectively are coupled and the output of which is coupled to an input of said number store, which unit is constructed to generate at its output, when activated, the value $N+K$ using the content of the number store as the value N and deriving the value r from the count signal output of the third counter, and to replace the content of the number store by the value N+K, means for activating said unit when a track on a storage disc has been filled with information bytes, a storage arrangement constructed to generate at an output thereof, when activated, bytes of information at a rate corresponding to the rate at which clock signals appear at the output of said clock signal generator, and a coupling to an address signal input of said storage arrangement from a count signal output of the second counter arrangement.

Embodiments of the invention will be described, by way of example, with reference to the accompanying diagrammatic drawings in which.

Figure 1:
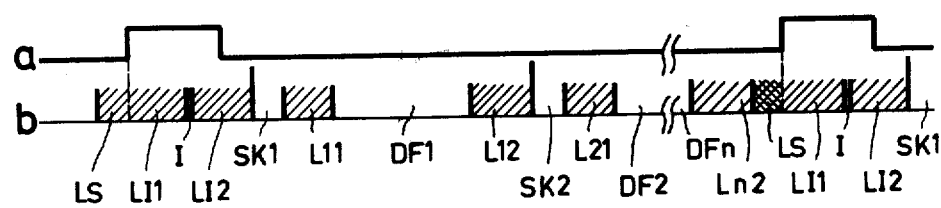
FIG. 1 is a schematic representation of the manner in which a track on a magnetisable storage disc is divided into sectors, and the sectors themselves are subdivided, according to a prior art standard format.

FIG. 1 shows, at a, two successive index pulses which can be derived from a known magnetizable storage disc when it is rotated through more than 360°. The leading edge of each index pulse may, for example, be produced by the passage of the same hole in the disc into a light path between a light source and an electro-optical sensor, which path is otherwise blocked by the material of the disc. The right-hand side of FIG. 1 (and also of FIG. 2) is therefore a repeat of the left-hand side.

FIG. 1 illustrates, at b, the corresponding division of one storage track on the disc into portions storing different types of information, the situation shown being that existing immediately after information is first written into the (empty) track. When a magnetic head then accesses the track iL, immediately after the leading edge of an index pulse at a is generated, pre-index portion LI1, which is 40 bytes long, which in turn is followed by an index character portion I. This index character portion contains seven bytes, six bytes of synchronizing information followed by one byte of index information.

The index character portion I is followed by a post-index portion LI2 which is 26 bytes long and is filled with mutually identical data characters which are ignored on read-out. There then begins a sequence of so-called sectors 1 to n which each have precisely the same format. By way of illustration, only the first sector, the beginning of the second sector and the end of the last sector n are shown. Each sector begins with a sector identification information portion SK 1, SK 2, etc., each of which contains a specific marker byte which denotes that the actual sector identification information follows, followed by bytes indicating the number of the relevant sector within the sequence and a track number.

The sector identification information portion is followed, in each case, by a portion L11, L21, etc. which is a given number of bytes long. Each portion L11, L21, etc, followed by the actual data field DF1 etc. of the sector, this field, when the sector information has first been written on an empty storage disc, containing random information. Each data field is followed by a portion L12 etc. which extends to the end of the sector (where, with the exception of the last sector n, the sector identification information portion of the next sector begins). The portion Ln2 of the last sector n is followed by a track gap portion LS which extends to the point corresponding to the generation of the leading edge of the next index mark, i.e. to the pre-index portion LI1.

The complete information illustrated, particularly the sector identification information, can typically be written into the track during one complete revolution of the disc by equipment in which the drive speed of the disc is precisely regulated so that for each revolution thereof substantially exactly the nominal number of 5208 bytes is written. After the start of such a writing operation the 40 bytes of the pre-index portion LI1 are written initially in response to the occurrence of the leading edge of the first index pulse. The appropriate seven bytes are then written into the index character portion, followed by the 26 bytes which make up the post-index portion LI2. The 13 bytes of the sector identification information SK1 of the first sector, including the relevant sector number, are then written, followed by 11 bytes which make up the portion L11. These are followed by 137 bytes which make up the data field DF1, followed by 27 bytes which make up the portion L12.

The part of this process which relates to the first sector is then repeated for sector 2 and all the subsequent sectors. Following the data field DFn of the last sector and the 27 bytes of the subsequent portion Ln2, further bytes are written until the leading edge of the next index pulse occurs. The portion of the track in which these further bytes are written constitutes the track gap portion LS which, at the nominal rate of rotation of the disc, is 273 bytes long. At the end of this track gap portion a joint occurs at which the written information may exhibit a phase shift (because an incomplete byte may be written thereat). This is of no importance, however, because no information which has to be subsequently evaluated is recorded at this point.

If a set of data is to be stored in a data field on a storage disc already provided in this way with sector identification information, the read-write head is set on the relevant track, and then the sector identification information is read until the sector is found into whose data field the data set is to be written. When the full sector identification information has been recognized, the system is switched over, after a given time, to writing, and the data set is written, preceded, for example, by six bytes of synchronizing information. The bytes of this newly written synchronizing information will not normally exactly coincide with (exactly overwrite) the bytes of the information which the relevant data field previously contained, but the newly written synchronization information will be sufficient to synchronize a byte clock pulse with the immediately following useful information during subsequent read-out. Moreover, the end of the newly written data set will in general not coincide exactly with the end of the relevant data field. In fact, if the rate of rotation of the storage disc is above the nominal rate, it may extend into the track portion L12 etc. between the relevant data field and the sector identification information of the next sector. (this track portion is of sufficient length that, even when the disc rotation rate is the maximum possible, the next sector identification information will remain intact). Thus the exact structure of the sectors described with reference to FIG. 1, in particular the precise lengths quoted for certain of the individual portions thereof, will normally no longer be present after useful information has been stored in the various data fields. The large track gap LS will, however, continue to be present.

Figure 2:
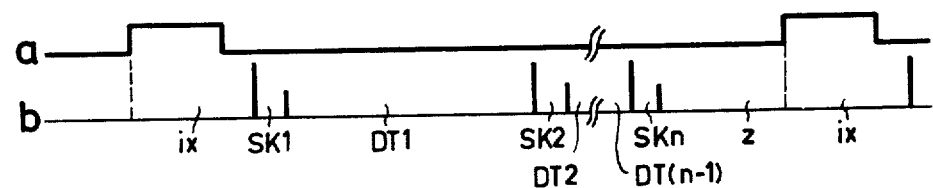
FIG. 2 is a schematic representation, corresponding to that of FIG. 1, showing how the division and subdivision may occur when an embodiment of the present invention is employed.

FIG. 2 corresponds to FIG. 1, but the format of the information in the track is somewhat different, allowing the individual sectors to be at least as long as those of FIG. 1, and an additional sector to be provided instead of the large track gap. In fact, because the sectors are practically uniformly distributed over the entire track length, the length of the additional sector (and of all the other sectors) is smaller than that of the track gap of FIG. 1, even when the speed of the storage disc is at the top end of its tolerance range during the writing operation, but is even larger than that of the sectors in the format shown in FIG. 1. The information is written into an empty track in the format shown at b in FIG. 2 in the following manner.

In response to the occurrence of the leading edge of the index pulse, which is shown at a in FIG. 2 and which is derived from the disc by means of a detector (not shown) for when a marker on the disc occupies a predetermined angular position, a predetermined number of bytes of random information is written. The portion of track in which this number of bytes is written is denoted in FIG. 2 as ix. (It is assumed that no index character is written; no use is made of such an index character in most applications anyway). Then the sector identification information SK1 of the first sector (similar to that shown in the track subdivision shown in FIG. 1) is written. This is not, however, now followed by the sequence of a further portion, a data field and another portion containing arbitrary information, but merely by a data field DT1 which extends as far as the next sector identification information SK2. The number of bytes written into data field DT1 is, during this write operation, chosen equal to the sum of the numbers of bytes in data field DF1 in FIG. 1 and in the preceding and the succeeding portions L11 and L12, i.e. 175 bytes.

After this number of bytes has been written defining the data part DT1, the sector identification information SK2 of the second sector is written, followed by bytes defining the data field DT2 in the same way as for the first sector. This process is continued as far as the last sector, which begins, after the bytes defining the data field DT (n−1) of the penultimate sector, once again with the relevant sector identification information SKn. Following this bytes continue to be written into a part z (the remainder of the track) in a similar manner to that in which bytes were written into the data fields of the preceding sectors, until the leading edge of the next index pulse occurs. This temporarily terminates the writing operation of parts ix now follow, as indicated in FIG. 2.

The writing operation so far described is not likely to give rise to an optimum uniform distribution of the sectors around the track, i.e. the sum of the lengths of the portions z and ix is likely to be appreciably different from the length of each data field DT. For a uniform distribution of the sectors over the entire track the sum of the numbers of bytes in the two parts z and ix (which together effectively form the data field of the last sector) must ideally be equal to the number N of the bytes in each of the data field of the other sectors, possibly after allowance is made for any inaccuracy in the recognition of the leading edge of the index pulse. This inaccuracy depends on the overall electrical and mechanical properties and tolerances of the equipment with which the disc is used and will be assumed here to correspond to a track length corresponding to five bytes. Accordingly, the number of bytes written into part z is counted, the equality, or lack of it, set out above is checked and, if the equality is not present, the (positive or negative) remainder or difference R is distributed over all the sectors in a new write operation. The remainder R is given by:

$$R = z + ix - N - j$$

where
z = number of bytes in part z,
ix = number of bytes in part ix,
N = number of bytes in each data part or field DT,
j = inaccuracy of recognition etc. of the index pulse leading edge (jitter).

The correction value K for the number of bytes in each data field is therefore given by:

$$K = \text{integer part of } R/m \text{ for } R \geq 0$$

$$K = (\text{integer part of } R/m) - 1 \text{ for } R < 0$$

where m is the number of sectors per track. The value K is calculated and, if it is non-zero, a similar writing operation to that previously carried out is then performed in the same track during a new revolution of the disc, the old content of this track being overwritten and a corrected number of bytes $$N_k = N + K$$

being used to define the data part DT of each of the sectors IF R/m is non-integral the bytes which cannot be uniformly distributed over the various sectors will be added to the number of bytes contained in the track portion comprising parts z and ix together. Because calculation of the correction value can be done very rapidly, i.e. take place within the period occupied by a single disc revolution, there need be only one disc revolution between the first and the second writing of the sector subdivision information into the same track. The disc speed is likely to be hardly changed at all in this short time so that the correction is likely to be reasonably exact. Moreover, it is unlikely that a new correction will be required if similar information is then written immediately into the next track using the corrected value $N_k$ of the number of bytes determining the data part of each sector. If the correction value K is found to be zero with respect to a given track, then no second writing operation of the sector subdivision information is, of course, carried out for this track, but the next track is processed immediately in such a case. In practice, it is found that, once the number of bytes defining the data fields has been corrected in the above manner, subsequent use of this corrected number will normally result in a second write operation being required in a given track only after many tracks have subsequently been processed.

Figure 3:
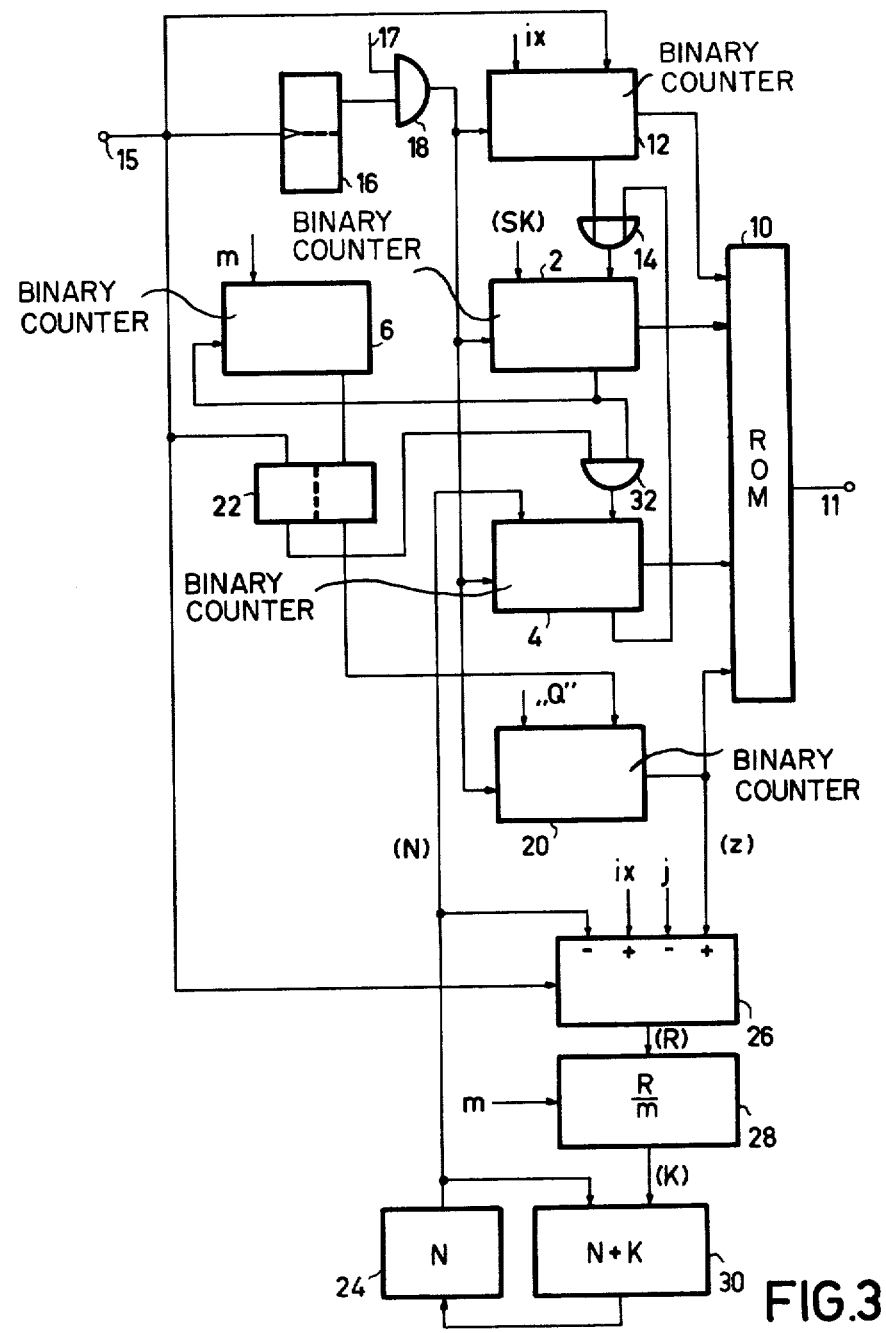
FIG. 3 a block diagram of an embodiment of the invention.

FIG. 3 is a block diagram of part of an apparatus for carrying out the method described above with reference to FIG. 2. The apparatus of FIG. 3 contains five binary counters 2, 4, 6, 12 and 20, a read-only memory 10, an arithmetic unit comprising an addition unit 26, a division unit 28 and an addition unit 30, a store 24 for a number extending to three orders of decimal significance, two bistable flip-flops 16 and 22, an OR element 14 and two AND elements 18 and 32. The apparatus also includes a clock pulse source (not shown) the clock pulses from which are fed to a line 17. This clock pulse source also controls the writing of the information on the storage disc (not shown), a clock pulse being fed to line 17 each time a complete byte has been written, i.e. each time eight successive bits have been written. The index pulses derived from the disc are fed to an input 15, i.e. the aforesaid detector has its output coupled to the input 15, and the information for a write head (not shown) which accesses the tracks of the storage disc is taken off from an output 11.

The counters 2, 4, 6 and 12 are down-counters which stop counting when they reach their zero count state and, when they reach this state, generate a logic "1" at their lower outputs. Their left-hand inputs are their clock inputs (as is the left-hand input of (up) counter 20) and their right-hand outputs are their "Q" outputs (as is the output of counter 20). The top left-hand inputs of all the counters are their data or "D" inputs and their top right-hand inputs, where shown, are their "parallel load" inputs. In fact, counter 6 also has such a parallel load input (not shown) fed from terminal 15. A monostable multivibrator or similar triggered generator (not shown) for a pulse having a duration less than the period of the clock pulses fed to line 17 is included in the "parallel load" inputs of the counters 12, 2, 4 and 20.

When the first index pulse appears at input 15 after a write process for a particular track is initiated, the bistable flip-flop 16, which operates as a 2-counter, is switched thereby to a state in which its output enables transmission through the AND element 18, such a process can, for example, be initiated by disabling a reset input (not shown) of flip-flop 16 that is holding this flip-flop in the state in which it blocks transmission through the AND element 18. The index pulse also causes counter 12 to be set to the number ix as defined above, and switches the bistable flip-flop 22 to a state in which its output enables transmission through the AND element 32. The clock pulses fed to line 17 now pass via the AND element 18 to the counting clock pulse inputs of counters 12, 2, 4 and 20; at this time, however, only counting in counter 12 has any effect on the ROM 10, address inputs of which can be connected to the Q-outputs of the counters 12, 2, 4 and 20 as alternatives by means of an address multiplexer (not shown) included therein, this multiplexer being switched at this stage to a condition in which it couples the Q-output of counter 12 to ROM 10. The Q-outputs of this counter therefore activate a succession of addresses in the read-only memory 10. Each activated address contains eight information bits which are fed in succession to the write head via output 11. Thus, information is written into the first part ix of the track of FIG. 2.

With each clock pulse that is fed thereto, the counter 12 counts down by one until it has reached its zero count state. When this occurs, it generates a signal at its "zero count" output and counter 2 is set thereby via the OR element 14 to a count state corresponding to the number of bytes in each sector identification information portion SK of FIG. 2 and is allowed to start counting. At the same time the aforesaid multiplexer is controlled so that the address inputs of store 10 are switched to the output of counter 2. The addresses activated here contain the sector identification information, including a number of preceding synchronizing bytes. Counter 2 now also counts down as far as its zero count state and, when this occurs, counter 6, the count of which is set to the number m of sectors per track, receives a downwards counting clock pulse and the count in counter 4, is set via the AND element 32 to a value corresponding to the content of store 24, which content is the number of bytes to be written to define the data part of each sector. Furthermore, the aforesaid multiplexer is switched to a state in which the address input of store 10 is switched to the output of the counter 4. With each clock pulse now applied to its counting clock pulse input counter 4 now counts down by one until it has reached its zero count state, resulting in bytes defining the data part of the first sector being written into the track. When counter 4 reaches its zero state, counter 2 is reset via the OR element 14 and starts counting again as a result of which the sector identification information of the second sector is written into the track.

The counting by counters 2 and 4 continues in this manner alternately, the count in counter 6 being decremented by one each time counter 2 reaches its zero count state until it itself reaches its zero count state. When this occurs, i.e. when the sector identification information relating to the last sector has been written, the resulting signal on the "zero count" output of counter 6 resets the bistable flip-flop 22, which in turn blocks transmission through the AND element 32 so that counter 4 cannot count, and at the same time resets (up) counter 20 so that this counter starts to count upwards from zero. (A further coupling (not shown) is in fact provided from bistable 22 to a "count inhibit input" of counter 20). At the same time the aforesaid multiplier is switched so that the address input of the read-only memory 10 is switched to the output of counter 20. The storage locations thus now addressed by counter 20 contain the same information as that written previously to define the data parts of the other sectors.

The counter 20 counts on, the appropriate information being written into the track, until the leading edge of the next index pulse appears at input 15. When this occurs, flip-flop 16 is reset thereby, blocking transmission through the AND element 18 so that none of the counters receive further counting clock pulses. At the same time the addition unit 26, which adds together the numerical values at the top four inputs thereof according to the signs given below these inputs, is activated. The result of the addition operation is the remainder R, by which the number of bytes in the part of the track between the sector identification information of the last and the first sectors, after allowing for jitter, differs from the number N of bytes in the data field of each sector and this remainder is fed to the division unit 28 which divides it by the number m of sectors in a track. The division unit outputs only the integer part of the quotient if the quotient is positive, and one less than this integer part if the quotient is negative. This output represents the correction value K and is fed to the addition unit 30 which adds it to the value contained in memory 24, i.e. to the number of bytes previously used to define the data part of each sector, and the result is transferred to memory 24 and overwrites the old value. The correction value K is also used in a manner not shown to stop the shifting of the writing head to the next track (which is arranged to otherwise occur) if this value should be different from zero, in which case the occurrence of the leading edge of the next index pulse, i.e. that occurring one revolution after the end of the preceding write operation, initiates a new writing operation in the same track, this time making use of the corrected value for the number of bytes defining the data part at each sector. When this operation is completed the subdivision of the relevant track into sectors is completed and the write head moves on to the next track, after which the same process begins again using the corrected value, because under normal circumstances, the disc speed will not vary very much, a value of zero for the correction value will now probably be obtained after the initial write operation in each of a number of successive tracks, meaning that these tracks can be written into immediately following one another.

Instead of the various counters it is also possible to use a smaller number of counter registers, the content of which are successively set to different values and/or are compared with different values. It is possible furthermore, to replace the three units 26, 28 and 30 by a single universal arithmetic unit. The functions of the entire circuit shown in FIG. 3 can alternatively be realized by a suitably programmed computer, for example a suitably programmed microprocessor system. Of course, if it can be assumed that the leading edges of the index pulses can be recognized in a jitter-free manner the quantity j may be chosen equal to zero.

What is claimed is:

1. A method of dividing a track on a rotatable, magnetizable information storage disc into m sectors by writing information bytes into said track until said track becomes full and in such manner that m groups of said bytes, each containing n bytes and comprising sector identification information, are written in succession with N further bytes written between each said group and the next to be written, (if present), characterized in that the number r of bytes present in the track between the last said group and the first said group when the track has become full is determined and the track is then refilled with information bytes in such manner that m groups of said bytes, each containing n bytes and comprising sector identification information, are written in succession with N+K further bytes written between each of these groups and the next to be written (if present), where K is equal to $(r-N-j)/m$ if $(r-N-j)/m$ is a whole number, and K is equal to the next whole number below $(r-N-j)/m$ if $(r-N-j)/m$ is not a whole number, j being a positive number or zero.

2. A method as claimed in claim 1, wherein the storage disc contains index information and the filling of the track with information bytes is commenced each time only in response to it being detected that the index information lies at a predetermined angular position, characterized in that the bytes of the first said group are written during the filling of the track only after a predetermined number of bytes have already been written in said track.

3. Apparatus for dividing a track on a rotatable, magnetizable information storage disc into m sectors by writing information bytes into said track until said track becomes full and in such manner that m groups of said bytes, each containing n bytes and comprising sector identification information, are written in succession with N further bytes written between each said group and the next to be written, comprising a byte clock signal generator, a number store (24), a first counter (6) constructed to generate, when activated, a signal at an output thereof when m pulses have been applied to a clock input thereof, a second cyclic counter arrangement (2, 4) to a clock input of which the output of said generator is coupled to a data input of which the output of said number store is coupled, and to a counter-inhibit input of which the output of the first counter is coupled, which arrangement is constructed, when activated, to perform a complete cycle each time n+x clock pulses are applied thereto, where x is the content of said number store, and to generate during each cycle a signal at an output thereof when n clock pulses have been applied to its clock input, a coupling from said output of said arrangement to the clock signal input of the first counter, a third counter (20) to a clock input of which the output of said generator is coupled and to a count-enable input of which the output of the first counter is coupled, an arithmetic unit (26, 28, 30) to inputs of which the output of said number store and a count signal output of said third counter respectively are coupled and the output of which is coupled to an input of said number store, which unit is constructed to generate at its output, when activated, the value N+K using the content of the number store as the value N and deriving the value r from the count signal output of the third counter, and to replace the content of the number store by the value N+K, means for activating said unit when a track on a storage disc has been filled with information bytes, a storage arrangement (10) constructed to generate at an output thereof, when activated, bytes of information at a rate corresponding to the rate at which clock signals appear at the output of said clock signal generator, and a coupling to an address signal input of said storage arrangement from a count signal output of the second counter arrangement.

4. Apparatus as claimed in claim 3, wherein said means for activating the arithmetic unit comprises a detector for when index information on the disc lies at a predetermined angular position, the output of which detector is coupled to an activation signal input of said unit, the apparatus including a fourth counter (12) to a clock input to which the output of said generator is coupled and to an activation signal input to which the output of said detector is coupled, said fourth counter being constructed to generate, when activated, a signal at an output thereof when a predetermined number of clock pulses has been applied to its clock input, which output is coupled to a count-enable input of the second counter arrangement, said arithmetic unit being constructed to derive the value r from the count signal output of the third counter increased by said predetermined number.

5. Apparatus as claimed in claim 4, wherein the first and fourth counters are down counters, and wherein the output of said detector is coupled to load inputs of said first and fourth counters for setting the contents of said first and fourth counters to m and said predetermined number respectively when said detector produces an output signal.

6. Apparatus as claimed in claim 3, wherein the second counter arrangement comprises first and second counter stages, wherein the output of the clock signal generator is coupled to clock signal inputs of each of said counter stages, wherein the first counter stage is constructed to generate, when activated, a signal at an output thereof when n clock pulses have been applied to its clock signal input, which output is coupled to a count-enable input of said second counter stage, wherein the second counter stage is constructed to generate, when activated, a signal at an output thereof when x clock pulses have been applied to its clock signal input, which output is coupled to a count-enable input of the first counter stage, and wherein the coupling from the second counter arrangement to the clock signal input of the first counter is from said output of the first counter stage.

7. Apparatus as claimed in claim 3, including a coupling from the count signal output of the third counter to an address input of said storage arrangement.

8. Apparatus as claimed in claim 7, including a coupling from the count signal output of the fourth counter to an address input of said storage arrangement.

* * * * *